(12) United States Patent
Hodder et al.

(10) Patent No.: US 7,362,497 B2
(45) Date of Patent: Apr. 22, 2008

(54) OPTICAL FIBRE

(75) Inventors: Benjamin Hodder, Dorchester (GB);
David John Hill, Dorchester (GB)

(73) Assignee: Qinetiq Limited (GB)

( * ) Notice: Subject to any disclaimer, the term of this patent is extended or adjusted under 35 U.S.C. 154(b) by 0 days.

(21) Appl. No.: 10/549,687

(22) PCT Filed: Mar. 11, 2004

(86) PCT No.: PCT/GB2004/001034
§ 371 (c)(1),
(2), (4) Date: Sep. 16, 2005

(87) PCT Pub. No.: WO2004/084365
PCT Pub. Date: Sep. 30, 2004

(65) Prior Publication Data
US 2006/0187534 A1    Aug. 24, 2006

(30) Foreign Application Priority Data
Mar. 18, 2003   (GB)   ................................. 0306137.1

(51) Int. Cl.
*H04B 10/17* (2006.01)
(52) U.S. Cl. .................... 359/341.3; 385/126
(58) Field of Classification Search ................ 385/126; 359/341.3
See application file for complete search history.

(56) References Cited

U.S. PATENT DOCUMENTS

| | | | | |
|---|---|---|---|---|
| 3,355,674 A | * | 11/1967 | Hardy | 372/36 |
| 3,445,785 A | * | 5/1969 | Koester et al. | 372/40 |
| 3,516,001 A | * | 6/1970 | Ask et al. | 372/6 |
| 3,646,472 A | * | 2/1972 | Cooper et al. | 372/72 |
| 4,593,973 A | * | 6/1986 | Yoshida et al. | 385/126 |
| 4,886,333 A | * | 12/1989 | Hicks | 385/12 |

(Continued)

FOREIGN PATENT DOCUMENTS

EP    0 435 217    7/1991

(Continued)

OTHER PUBLICATIONS

Ouelette, Francois. Fiber Bragg Gratings. SPIE's OEmagazine. Jan. 2001. pp. 38-40. Downloaded from: http://oemagazine.com/fromTheMagazine/jan01/Tutorial.pdf.*

*Primary Examiner*—Deandra M. Hugehs
*Assistant Examiner*—Ari M Diacou
(74) *Attorney, Agent, or Firm*—McDonnell Boehnen Hulbert & Berghoff LLP

(57) ABSTRACT

This invention relates to optical fibres, fibre lasers, fibre laser arrays and sensor systems comprising fibre laser arrays. Conventional fibre laser sensor arrangements comprise a plurality of fibre lasers arranged in series along a length of optical fibre. A pump light source is located a one end of the fibre and supplies pump light energy to each of the fibre lasers in turn. Such sensor systems experience a number of disadvantages. Firstly, there is an uneven distribution of pump power along the length of the fibre which effectively limits the number of laser devices that can successfully be incorporated into the optical fibre array. Secondly, the manner in which existing sensor systems are constructed often results in back reflections, optical losses and mechanical weaknesses. The present invention provides a fibre laser which mitigates the above problems with fibre laser sensor arrays.

14 Claims, 3 Drawing Sheets

U.S. PATENT DOCUMENTS

| Patent No. | | Date | Inventor | Class |
|---|---|---|---|---|
| 4,938,561 A | * | 7/1990 | Grasso et al. | 359/341.1 |
| 4,955,685 A | * | 9/1990 | Garman | 359/341.32 |
| 5,121,460 A | * | 6/1992 | Tumminelli et al. | 385/126 |
| 5,144,690 A | * | 9/1992 | Domash | 385/12 |
| 5,237,576 A | * | 8/1993 | DiGiovanni et al. | 372/6 |
| 5,268,910 A | * | 12/1993 | Huber | 372/6 |
| 5,485,480 A | | 1/1996 | Kleinerman | 372/6 |
| 5,497,442 A | | 3/1996 | Roos et al. | 385/128 |
| 5,513,913 A | * | 5/1996 | Ball et al. | 374/120 |
| 5,666,372 A | * | 9/1997 | Ball et al. | 372/6 |
| RE35,962 E | * | 11/1998 | Ball et al. | 372/6 |
| 5,898,811 A | * | 4/1999 | DiGiovanni et al. | 385/126 |
| 5,949,941 A | * | 9/1999 | DiGiovanni | 385/127 |
| 6,343,174 B1 | * | 1/2002 | Neuberger | 385/123 |
| 6,477,295 B1 | * | 11/2002 | Lang et al. | 385/31 |
| 6,496,303 B1 | * | 12/2002 | Fleming | 359/337.1 |
| 6,560,247 B2 | * | 5/2003 | Chang et al. | 372/6 |
| 6,597,711 B2 | * | 7/2003 | Fernald et al. | 372/20 |
| 6,621,957 B1 | * | 9/2003 | Sullivan et al. | 385/37 |
| 6,625,180 B2 | * | 9/2003 | Bufetov et al. | 372/3 |
| 6,836,607 B2 | * | 12/2004 | Dejneka et al. | 385/126 |
| 6,839,496 B1 | * | 1/2005 | Mills et al. | 385/126 |
| 6,842,566 B2 | * | 1/2005 | Ishikawa et al. | 385/37 |
| 2002/0012378 A1 | * | 1/2002 | Zenteno | 372/108 |
| 2002/0041724 A1 | * | 4/2002 | Ronnekleiv et al. | 385/12 |
| 2002/0071646 A1 | * | 6/2002 | Eggleton et al. | 385/125 |
| 2002/0092977 A1 | * | 7/2002 | Lerber et al. | 250/227.14 |
| 2002/0122645 A1 | * | 9/2002 | Po | 385/126 |
| 2002/0146226 A1 | * | 10/2002 | Davis et al. | 385/126 |
| 2002/0172485 A1 | * | 11/2002 | Keaton et al. | 385/127 |
| 2002/0191928 A1 | * | 12/2002 | Carter et al. | 385/127 |
| 2003/0021533 A1 | * | 1/2003 | Ishikawa et al. | 385/37 |
| 2003/0063629 A1 | * | 4/2003 | Davis et al. | 372/6 |
| 2003/0095767 A1 | * | 5/2003 | Hiroishi et al. | 385/126 |
| 2003/0152115 A1 | * | 8/2003 | Jiang et al. | 372/6 |
| 2003/0152349 A1 | * | 8/2003 | Lauzon et al. | 385/126 |
| 2004/0057471 A1 | * | 3/2004 | Shevy et al. | 372/6 |
| 2004/0125827 A1 | * | 7/2004 | Martinelli et al. | 372/3 |
| 2004/0141702 A1 | * | 7/2004 | Fuflyigin et al. | 385/123 |
| 2005/0105866 A1 | * | 5/2005 | Grudinin et al. | 385/123 |

FOREIGN PATENT DOCUMENTS

| | | |
|---|---|---|
| JP | 1 143380 | 6/1989 |
| WO | WO 94/17366 | 8/1994 |

* cited by examiner

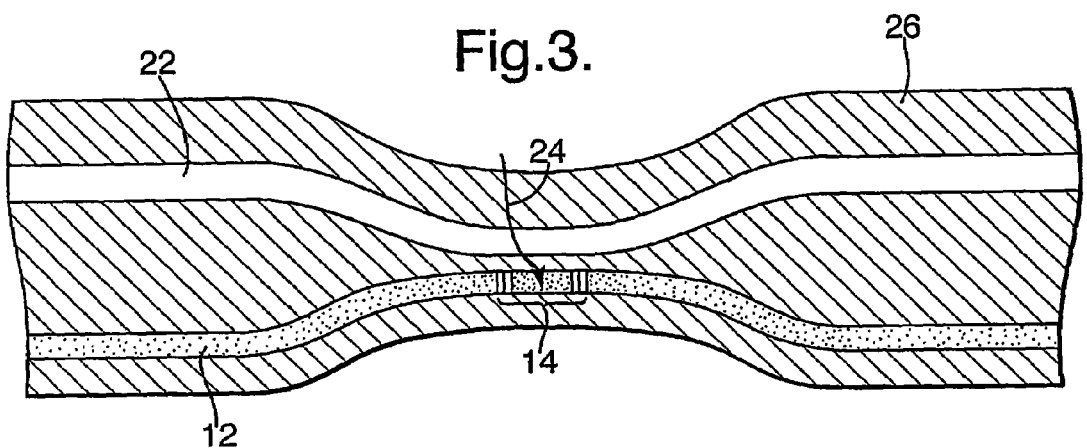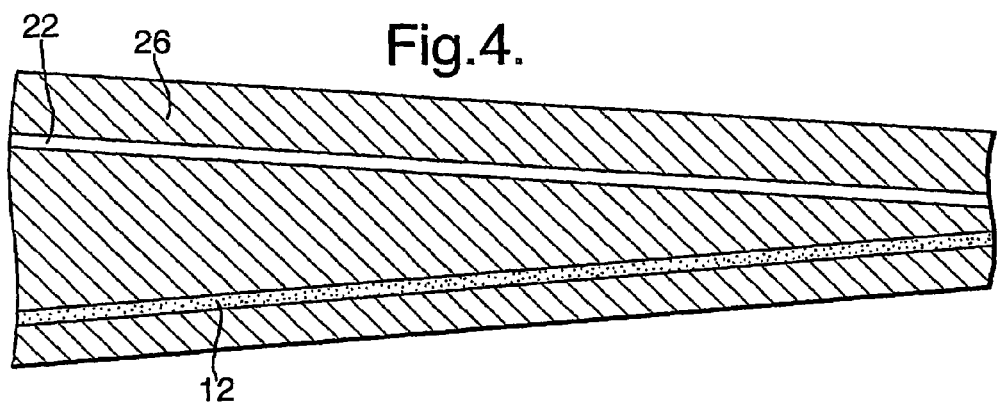

OPTICAL FIBRE

This invention relates to optical fibres, fibre lasers, fibre laser arrays and sensor systems comprising fibre laser arrays.

Optical fibre are fabricated from fine fibres of glass. They consist of a glass fibre core surrounded by a glass "optical cladding" layer. They make use of Total Internal Reflection (TIR) to confine light within the fibre core.

Fibre lasers comprise a Bragg grating structure embedded in a region of optical fibre doped with a rare earth element, such as Erbium or a combination of Erbium and Ytterbium. The gratings act as mirrors for the lasing volume (the doped area of the fibre) and the lasing wavelength is defined by the grating pitch. Such fibre lasers are often used in sensing applications.

Fibre lasers generally take one of two forms. The first comprises the two Bragg gratings having merely a quarter wavelength change in phase separating them, this is called a DFB (Distributed Feed Back) fibre laser. The second comprises the two Bragg gratings at a distance from each other with the cavity therebetween, this is called a DBR (Distributed Bragg Reflector) fibre laser.

Generally, the DFB fibre laser is considered to be optically more stable than the DBR device. Furthermore, it is currently being produced commercially so that the price of this device is expected to reduce significantly in the future.

WO 94/17366 describes a conventional fibre laser sensor arrangement wherein a plurality of fibre lasers are arranged in series along a length of optical fibre. A pump light source is located a one end of the fibre and supplies pump light energy to each of the fibre lasers in turn. The lasers each lase at slightly different wavelengths and are susceptible to perturbations acting on the fibre. The perturbations cause the wavelength of the lasers to shift slightly and these changes are analysed by a spectrum analyser located at one of the ends of the fibre.

Sensor systems such as the one described above experience a number of disadvantages. Firstly, there is an uneven distribution of pump power along the length of the fibre and consequently lasers closer to the pump source receive more power than lasers which are further away. This drop off in available pump power effectively limits the number of laser devices that can successfully be incorporated into the optical fibre array. Various methods for ensuring a more even distribution of pump power are known, for example through changes in the dopant concentration in the active laser cavity or, by the design of the laser cavity, but result in cost implications and also generally impact upon sensor performance.

Increasing the available pump power is only effective up to a certain level since higher pump powers result in large temperature gradients across individual laser elements within the sensor. Again, this has an impact on sensor performance.

Secondly, the manner in which existing sensor systems are constructed often results in back reflections, optical losses and mechanical weaknesses. Any doped areas of the fibre will absorb pump energy. Therefore in order to maximise the efficiency of the sensor the system is constructed by splicing individual doped fibre elements into an undoped optical fibre. Although this means that pump energy is only absorbed in the laser elements it does have the drawback of being a time consuming fabrication process which also gives rise to optical losses and back reflections within the array that can impact upon the stability of the fibre laser devices. Furthermore, the discontinuous nature of the array gives rise to mechanical weaknesses.

It is therefore an object of the present invention to provide a fibre laser which mitigates the above problems with fibre laser sensor arrays.

Accordingly, this invention provides an optical fibre comprising a first fibre core, the core being doped and having at least one fibre laser, the at least one laser comprising a pair of reflection gratings embedded in the first fibre core to form a lasing volume and a second undoped fibre core separated from the first fibre core by cladding material of the optical fibre wherein the second fibre core is optically coupled to the lasing volume of each of the at least one fibre laser in the first fibre core.

The invention provides an optical fibre having two separate fibre cores. Fibre lasers are contained within the first core which is doped along its entire length. A second fibre core is provided and is optically coupled to the lasing volume of each laser in the first core. In use pump light from a pump source is transmitted down the second fibre core (the "pump core") and is consequently coupled into the lasing regions in the first fibre core.

The reflection gratings will generally be Bragg gratings although the skilled man will appreciate that any suitable narrow band reflective grating may be used.

In an optical sensor system based on an optical fibre according to the invention any number of fibre lasers could be incorporated into the first fibre core. However, for applications such as remote sensing arrays a plurality of fibre lasers are likely to be used.

The amount of optical coupling can be controlled between the two fibre cores and so a more even distribution of pump power ban be obtained. Furthermore, since the pump light is supplied via a separate fibre core the fibre containing the fibre lasers can be doped along its length. This in turn means that the optical fibre can be fabricated as one single structure. No splicing is necessary and consequently there are no issues of reduced mechanical strength, optical losses, or back reflections as associated with the prior art arrangements.

The optical coupling between the fibre cores can be achieved either by bringing them into close physical proximity or by incorporating long period gratings (LPGs) into the pump core. Conveniently, if the optical coupling is achieved by LPGs then the amount and wavelength of the pump light coupled into each of the fibre lasers can be controlled.

Conveniently, extra reflection gratings can enclose each of the fibre lasers. The gratings can be designed such that they reflect any pump light that might "leak" out of the pumping volume into the rest of the first fibre core. These extra gratings therefore increase the efficiency of the fibre lasers by ensuring the pump light is contained in the lasing volume.

Light emitted from the fibre lasers will propagate down the first fibre core. In a sensor system incorporating an optical fibre according to this invention this light can be detected and analysed for perturbations affecting the optical fibre. For long length fibres it would be desirable to include means to amplify the fibre laser outputs.

Amplification can conveniently be provided by incorporating additional gain regions into the first fibre core between the fibre lasers (Note: in the case where the fibre lasers have been enclosed by additional gratings as described above then the additional gain regions should be located outside of the enclosed regions of the fibre). These gain regions can be formed by embedding reflection grating pairs in the first fibre core and optically coupling, preferably by means of LPGs, light from the second core to the regions enclosed by these grating pairs. Light coupled from the second core will therefore excite the dopant in the gain regions of the fibre. Any light emitted from one of the fibre lasers that traverses such a section will then be optically amplified.

In order to ensure that the fibre lasers receive as much pump light as possible it is convenient to use different wavelengths of light to pump the lasers and to excite the additional gain regions. For example, in the instance where erbium is used as the dopant light of wavelength 980 nm or 1480 nm can be used to pump the laser. Therefore the optical fibre can be constructed such that light of both wavelengths is introduced into the second fibre core. A first set of LPGs can then couple one wavelength to the lasers and a second set of LPGs can couple light of the other wavelength to the additional gain regions. For this example it has been found that 1480 nm light provides more efficient pumping resulting in less temperature gradient effects thereby maximising laser efficiency. Note: often the term 14XX nm is used by the skilled man as the pump wavelength around 1480 nm can vary, e.g. 1460-1480 nm. These variations also provide more efficient pumping than 980 nm and so it should be appreciated that the term "1480 nm" should be taken to include these wavelength variations.

A further embodiment to the invention is to include a third fibre core within the optical fibre which is optically coupled to the output of the fibre lasers and separated from the first and second fibre cores by cladding material of the optical fibre. This arrangement helps to reduce the level of cross talk between fibre laser sensors within the array.

The optical fibre can also be tapered along its length. As the amount of taper increases the fibre cores become physically closer thereby providing gradually more pump power to devices further down the array. This increases the amount of optical coupling between the cores and increases the efficiency of the system. Tapering can be achieved by stretching the fibre and this approach provides a method of tuning the operating wavelength of successive fibre lasers along the optical fibre. This method can reduce fabrication costs since each fibre laser device could conceivably be written identically before stretching the fibre.

Embodiments of the invention are described below by way of example only and in reference to the accompanying drawings in which:

FIGS. 2, 3, 4 and 5 shows optical fibres according to the invention

Note: in FIGS. 2-6 like features are denoted by like numerals.

Figure 1:
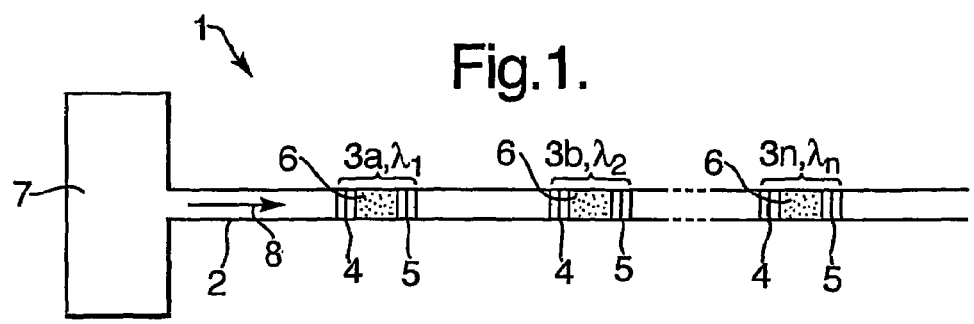
FIG. 1 shows an example of a known fibre laser based sensor system

Turning to FIG. 1 a fibre laser array 1 comprises an optical fibre 2 having a plurality of fibre lasers 3a, 3b . . . 3n each laser having a pair of Bragg gratings 4, 5 embedded in a doped section of optical fibre 6. A pump source 7 supplies pump light 8 to each of the lasers. The grating spacings of each laser is slightly different resulting in output laser light of slightly different wavelengths $\lambda_1, \lambda_2, \lambda_n$.

The Bragg gratings are written into the optical fibre by known means. See for example U.S. Pat. No. 4,725,110 and U.S. Pat. No. 4,807,950.

In use the signal radiation from each of the lasers 3 is coupled to a spectrum analyser (not shown) for analysis thereby forming a sensor array. This arrangement has the drawbacks described above, namely an uneven distribution of the pump source 7 across the lasers 3 and the disadvantages associated with splicing the lasers 3 into the optical fibre 2.

Figure 2:
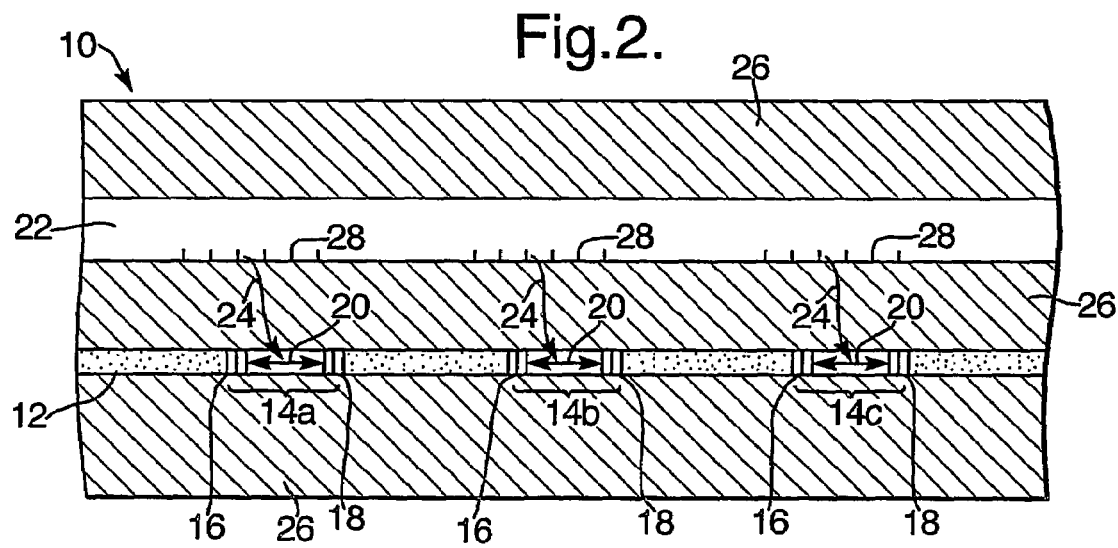

FIG. 2 shows a section of an optical fibre 10 according to the present invention. A first optical fibre core 12 has a plurality lasers 14a, 14b, 14c embedded therein. Each laser comprises a pair of Bragg gratings 16a,18a; 16b,18b; 16c, 18c which define a lasing volume 20. The fibre core 12 is doped along its entire length.

A second fibre core 22 serves to supply pump light 24 from the pump source which is then optically coupled to the first fibre core 12. Pump light 24 is supplied to each of the lasers 14a, 14b, 14c in the first fibre core 12. The two fibre cores 12, 22 are held within a cladding structure 26.

The two fibre cores 12, 22 are optically coupled by long period gratings (LPGs) 28 written into the pump fibre core 22 in the vicinity of the lasers 14 in the first fibre core 12. The LPGs 28 allow the amount and wavelength of light coupled 24 into the first fibre core 12 to be controlled.

Figure 2A:
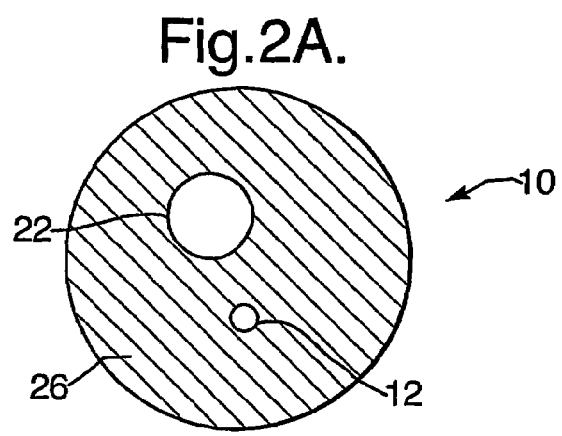

FIG. 2a shows a cross sectional view of FIG. 2 and shows the relative locations of the doped fibre core 12 and pump fibre core 22 within the cladding structure 26.

FIG. 3 shows an alternative means by which the two fibre cores 12, 22 within the cladding structure 26 can be optically coupled. In FIG. 3 the whole structure is tapered in the region of each laser 14.

FIG. 4 shows a still further embodiment of the optical fibre whereby the cladding structure 26 is progressively tapered along its entire length in such a way as to bring the two fibre cores 12, 22 closer together. The pump source (not shown) is located at the wider end of the structure and the tapered nature of the construction means that a higher proportion of the available pump light 24 is coupled into the doped fibre core 12 the further away a laser 14 is from the actual pump source. This has the effect of improving the coupling of radiation along the fibre.

Figure 5:
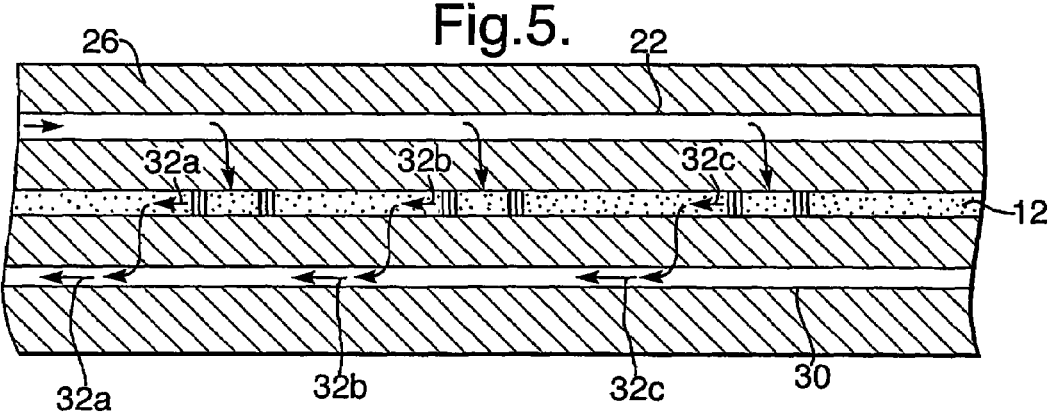

FIG. 5 shows an arrangement in which a third fibre core 30 is optically coupled to the doped fibre core 12 in order to provide a conduit in use for the output signals 32a, 32b, 32c from each laser 14a, 14b, 14c. This arrangement will reduce cross talk within the device and make it easier to analyse the output signals at the ends of the fibre.

Figure 6:
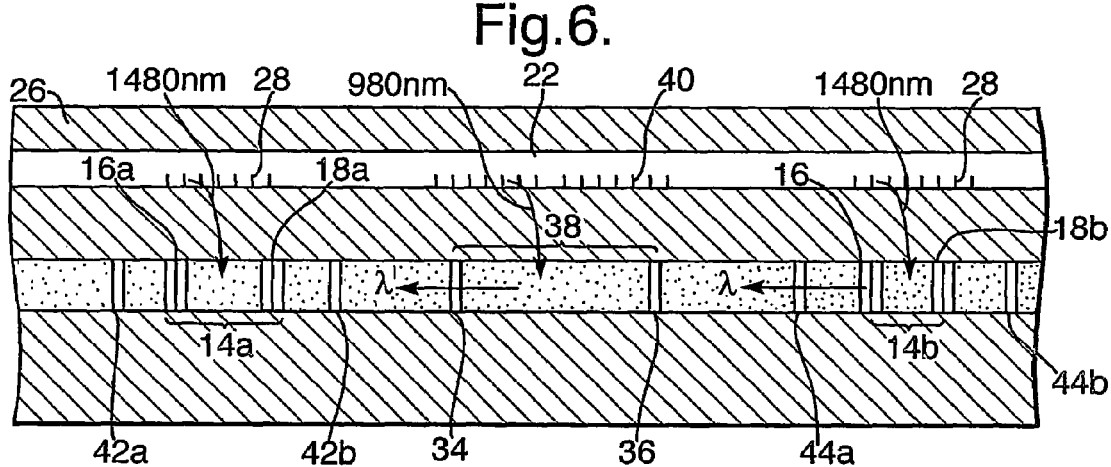
FIG. 6 shows an optical fibre according to the invention including signal amplification means

FIG. 6 shows an optical fibre design in which additional Bragg gratings 34, 36 are incorporated into the doped fibre core 12. In this design lasers 14 are written into the doped core 12 as before. Additional Bragg gratings 34, 36 are incorporated in the fibre core 12 between the lasers 14 to form an additional gain region 38. LPGs 28, 40 couple radiation at 1480 nm into the lasers 14 and also radiation at 980 nm into the gain region 38. As shown in this figure, light A emitted by laser 14b passes through the gain region 38 and is effectively amplified, $\lambda'$.

In order to maximise the efficiency of the optical fibre the light that is coupled into the gain region 38 is of a different wavelength to the light coupled into the lasers. In the case of an erbium doped fibre pump light of wavelengths 980 nm and 1480 nm is capable of exciting the dopant to cause lasing action.

In FIG. 6 LPGs sensitive to radiation of wavelength 1480 nm, 28, couple light to the lasers 14. Further LPGs 40 sensitive to radiation of wavelength 980 nm couple light into the gain region 38. The Bragg gratings 34, 36 in the lasers reflect radiation of wavelength 1480 nm and the Bragg gratings within the gain region reflect light of 980 nm.

Figure 7:
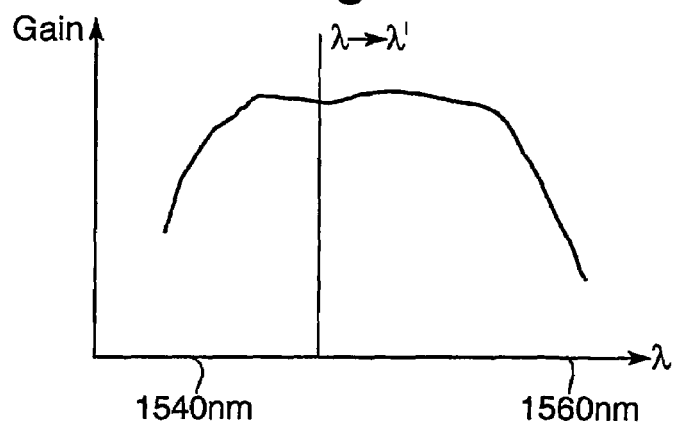
FIG. 7 shows a plot of signal gain versus wavelength for the dopant erbium.

Light emitted by the lasers is in the region of 1540-1560 nm. As shown in FIG. 7 light in this wavelength range will be amplified as it passes through the gain region thereby improving the efficiency of the optical fibre.

In order to maximise efficiency still further additional Bragg gratings 42a, 42b; 44a, 44b which restrict propagation of light of wavelength 1480 nm are incorporated into the doped fibre core 12 between the lasers 14 and the gain region 38. This ensures that as much 1480 nm radiation as possible is contained within the lasing volume of the lasers.

The invention claimed is:

1. An optical fibre comprising:
   a first fibre core, the core being doped and having at least one fibre lasing volume, the at least one lasing volume comprising a pair of reflection gratings embedded in the first fibre core
   and a second undoped fibre core separated from the first fibre core by cladding material of the optical fibre wherein the second fibre core is selectively optically coupled to each of the at least one lasing volumes in the first fibre core such that in use pump light from a pump source can propagate down the second fibre core and be selectively coupled into the at least one lasing volume.

2. An optical fibre as claimed in claim 1 wherein each of the at least one lasing volume is enclosed by an additional pair of reflection gratings arranged in use to reflect pump light propagating from the lasing volume of each of the at least one fibre lasing volume in the first fibre core.

3. An optical fibre as claimed in claim 1 wherein
   a) the first fibre core contains a plurality of fibre lasing volumes spaced in series along the length of the core and
   b) additional pairs of reflection gratings are located between some or all of the plurality of fibre lasers, and
   c) the second fibre core is additionally optically coupled to the regions bounded by each of the additional pairs of reflection gratings.

4. An optical fibre as claimed in claim 3 wherein a first set of long period gratings optically couples the second fibre core to each lasing volume and a second set of long period gratings optically couples the second fibre core to the regions bounded by the additional reflection gratings, the first and second sets of long period gratings being arranged in use to couple different wavelengths of light.

5. An optical fibre as claimed in claim 1 wherein
   a) the first fibre core contains a plurality of fibre lasing volumes spaced in series along the length of the core and
   b) each laser is enclosed by a pair of reflection gratings arranged in use to reflect pump light propagating from each lasing volume of each fibre laser back into the lasing volume, and
   c) additional pairs of reflection gratings are located between some or all of the enclosed fibre lasing volumes and
   d) the second fibre core is additionally optically coupled to the regions bounded by each of the additional pairs of reflection gratings.

6. An optical fibre as claimed in claims 5 wherein a first set of long period gratings optically couples the second fibre core to each lasing volume and a second set of long period gratings optically couples the second fibre core to the regions bounded by the additional reflection gratings, the first and second sets of long period gratings being arranged in use to couple different wavelengths of light.

7. An optical fibre as claimed in claim 1 wherein the optical fibre is tapered along its length.

8. An optical fibre as claimed in claim 1 wherein the second fibre is optically coupled to the first fibre by one or more long period gratings.

9. An optical fibre as claimed in claim 2 wherein the second fibre is optically coupled to the first fibre by one or more long period gratings.

10. An optical fibre as claimed in claim 1 wherein the optical fibre comprises a further third fibre core, the third fibre core being optically coupled to the at least one laser of the first fibre core and separated from the first and second fibre cores by cladding material of the optical fibre.

11. A sensor system characterised by an optical fibre according to claim 1.

12. A sensor system comprising an optical fibre according to claim 1 comprising
    a pump source operably connected to the second fibre core of the optical fibre and detection means arranged to detect and analyse light emitted from the optical fibre.

13. An optical fibre as claimed in claim 1 wherein the optical fibre is tapered along its length.

14. An optical fibre according to claim 1, wherein first and second cores are spaced apart within a cladding structure.

* * * * *